United States Patent
Bragstad et al.

(10) Patent No.: US 9,619,266 B2
(45) Date of Patent: Apr. 11, 2017

(54) TEARING DOWN VIRTUAL MACHINES IMPLEMENTING PARALLEL OPERATORS IN A STREAMING APPLICATION BASED ON PERFORMANCE

(71) Applicant: International Business Machines Corporation, Armonk, NY (US)

(72) Inventors: Lance Bragstad, Pine Island, MN (US); Michael J. Branson, Rochester, MN (US); Bin Cao, Rochester, MN (US); James E. Carey, Rochester, MN (US); Mathew R. Odden, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 231 days.

(21) Appl. No.: 14/511,284

(22) Filed: Oct. 10, 2014

(65) Prior Publication Data

US 2016/0103697 A1 Apr. 14, 2016

(51) Int. Cl.
G06F 9/455 (2006.01)

(52) U.S. Cl.
CPC ........... *G06F 9/45558* (2013.01); *G06F 2009/45562* (2013.01); *G06F 2009/45575* (2013.01); *G06F 2009/45591* (2013.01)

(58) Field of Classification Search
None
See application file for complete search history.

(56) References Cited

U.S. PATENT DOCUMENTS

| | | | |
|---|---|---|---|
| 8,161,479 B2 | 4/2012 | Sedukhin et al. | |
| 2012/0259909 A1 | 10/2012 | Bachelor et al. | |
| 2012/0271927 A1* | 10/2012 | Shakirzyanov | G06F 9/5061 709/220 |
| 2012/0284708 A1* | 11/2012 | Anderson, III | G06F 9/45558 718/1 |
| 2014/0082612 A1 | 3/2014 | Breitgand et al. | |
| 2016/0139949 A1* | 5/2016 | Jagannath | G06F 9/5022 718/1 |

OTHER PUBLICATIONS

Bragstad et al., "Tearing Down Virtual Machines Implementing Parallel Operators in a Streaming Application Based on Performance" U.S. Appl. No. 14/528,862, filed Oct. 30, 2014.
List of IBM Patents or Patent Applications Treated As Related.

* cited by examiner

*Primary Examiner* — Emerson Puente
*Assistant Examiner* — Steven Do
(74) *Attorney, Agent, or Firm* — Martin & Associates, LLC; Derek P. Martin (57) ABSTRACT

A streams manager monitors performance of parallel portions of a streaming application implemented in multiple virtual machines (VMs). When the performance provided by the multiple VMs is no longer needed, one or more of the VMs can be torn down. The performance of the VMs is monitored. When the least performing VM can be torn down, it is torn down. When the least performing VM cannot be torn down, information regarding a better performing VM is gathered, and it is determined whether the least performing VM can be made more similar to the better performing VM. When the least performing VM can be made more similar to the better performing VM, the least performing VM is changed to improve its performance, and the better performing VM is torn down.

9 Claims, 6 Drawing Sheets

TEARING DOWN VIRTUAL MACHINES IMPLEMENTING PARALLEL OPERATORS IN A STREAMING APPLICATION BASED ON PERFORMANCE

BACKGROUND

1. Technical Field

This disclosure generally relates to streaming applications, and more specifically relates to selecting which of multiple virtual machines (VMs) that implement parallel operators in a streaming application should be torn down based on performance of the operators in the VMs.

2. Background Art

Streaming applications are known in the art, and typically include multiple operators coupled together in a flow graph that process streaming data in near real-time. An operator typically takes in streaming data in the form of data tuples, operates on the tuples in some fashion, and outputs the processed tuples to the next operator. Streaming applications are becoming more common due to the high performance that can be achieved from near real-time processing of streaming data.

Many streaming applications require significant computer resources, such as processors and memory, to provide the desired near real-time processing of data. However, the workload of a streaming application can vary greatly over time. Allocating on a permanent basis computer resources to a streaming application that would assure the streaming application would always function as desired (i.e., during peak demand) would mean many of those resources would sit idle when the streaming application is processing a workload significantly less than its maximum. Furthermore, what constitutes peak demand at one point in time can be exceeded as the usage of the streaming application increases. For a dedicated system that runs a streaming application, an increase in demand may require a corresponding increase in hardware resources to meet that demand.

Systems have been developed to dynamically increase the performance of a streaming application by creating parallel paths of operators that are implemented in multiple virtual machines (VMs). Once there are multiple parallel paths of operators in different VMs, should it be determined that the processing capability of all of the parallel paths is no longer needed, one of more of the VMs can be torn down. One solution would be to tear down the VM that was last created. However, this could result in tearing down a parallel path that is performing better than another parallel path.

BRIEF SUMMARY

A streams manager monitors performance of parallel portions of a streaming application implemented in multiple virtual machines (VMs). When the performance provided by the multiple VMs is no longer needed, one or more of the VMs can be torn down. The performance of the VMs is monitored. When the least performing VM can be torn down, it is torn down. When the least performing VM cannot be torn down, information regarding a better performing VM is gathered, and it is determined whether the least performing VM can be made more similar to the better performing VM. When the least performing VM can be made more similar to the better performing VM, the least performing VM is changed to improve its performance, and the better performing VM is torn down. When the least performing VM cannot be made more similar to the better performing VM, if the least performing VM can be migrated to a location where the least performing VM can be made more similar to the better performing VM, the least performing VM is migrated, changed to improve its performance, and the better performing VM is torn down. When the least performing VM cannot be made more similar to the better performing VM, and when the least performing VM cannot be migrated, the better performing VM is torn down. When a VM is torn down, the performance data relating to the VM and other VMs that implement parallel paths is logged to enhance the likelihood that a VM can be created that will be retained in the future.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and.

DETAILED DESCRIPTION

The disclosure and claims herein relate to a streams manager that monitors performance of parallel portions of a streaming application implemented in multiple virtual machines (VMs). When the performance provided by the multiple VMs is no longer needed, one or more of the VMs can be torn down. The performance of the VMs is monitored. When the least performing VM can be torn down, it is torn down. When the least performing VM cannot be torn down, information regarding a better performing VM is gathered, and it is determined whether the least performing VM can be made more similar to the better performing VM. When the least performing VM can be made more similar to the better performing VM, the least performing VM is changed to improve its performance, and the better performing VM is torn down.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 1:
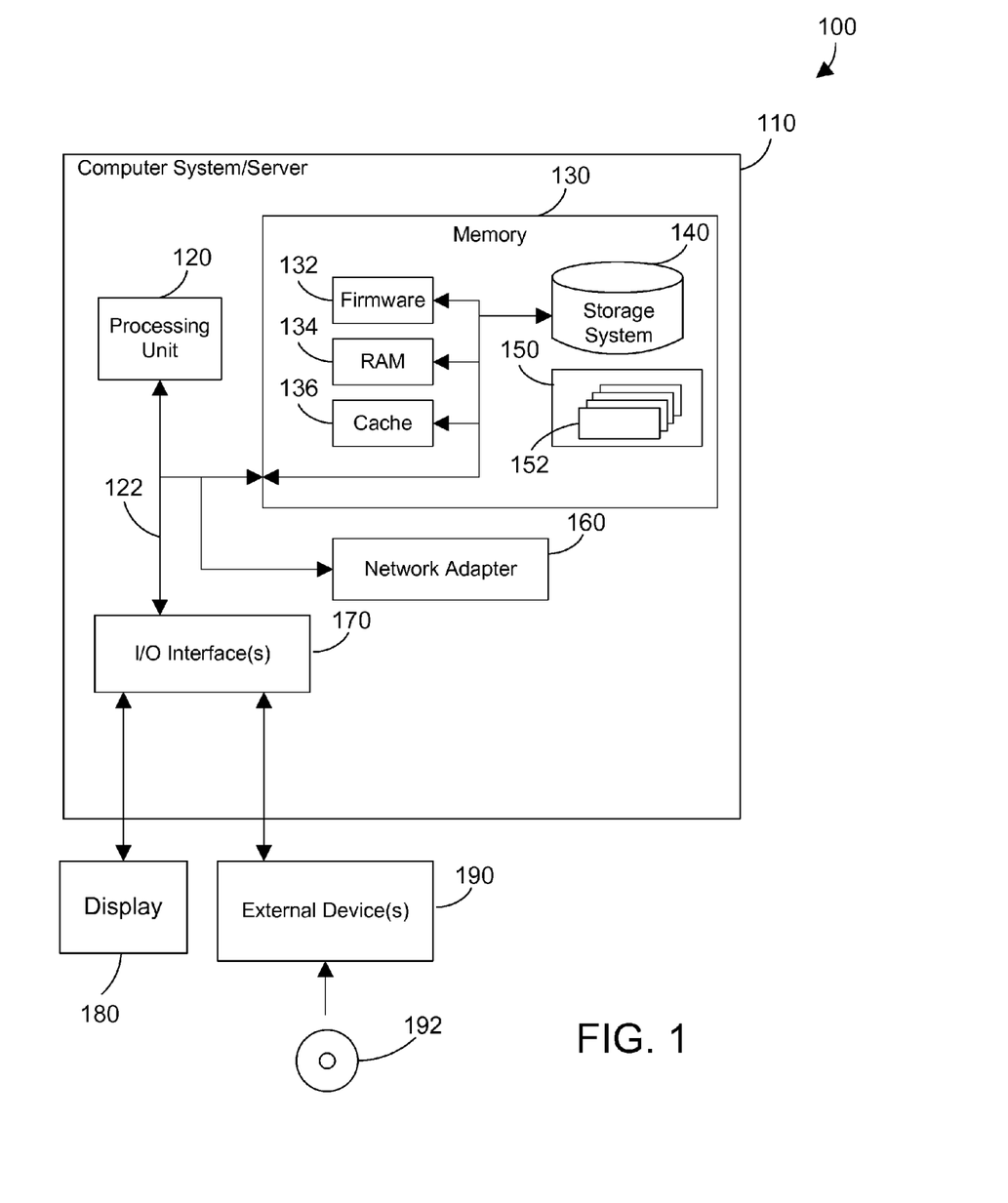
FIG. 1 is a block diagram of a cloud computing node.

Referring now to FIG. 1, a block diagram of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 110, which is operational with numerous other general purpose or special purpose computing system environments or configurations. Examples of well-known computing systems, environments, and/or configurations that may be suitable for use with computer system/server 110 include, but are not limited to, personal computer systems, server computer systems, tablet computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 110 may be described in the general context of computer system executable instructions, such as program modules, being executed by a computer system. Generally, program modules may include routines, programs, objects, components, logic, data structures, and so on that perform particular tasks or implement particular abstract data types. Computer system/server 110 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 110 in cloud computing node 100 is shown in the form of a general-purpose computing device. The components of computer system/server 110 may include, but are not limited to, one or more processors or processing units 120, a system memory 130, and a bus 122 that couples various system components including system memory 130 to processing unit 120.

Bus 122 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 110 typically includes a variety of computer system readable media. Such media may be any available media that is accessible by computer system/server 110, and it includes both volatile and non-volatile media, removable and non-removable media. An example of removable media is shown in FIG. 1 to include a Digital Video Disc (DVD) 192.

System memory 130 can include computer system readable media in the form of volatile or non-volatile memory, such as firmware 132. Firmware 132 provides an interface to the hardware of computer system/server 110. System memory 130 can also include computer system readable media in the form of volatile memory, such as random access memory (RAM) 134 and/or cache memory 136. Computer system/server 110 may further include other removable/non-removable, volatile/non-volatile computer system storage media. By way of example only, storage system 140 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 122 by one or more data media interfaces. As will be further depicted and described below, memory 130 may include at least one program product having a set (e.g., at least one) of program modules that are configured to carry out the functions described in more detail below.

Program/utility 150, having a set (at least one) of program modules 152, may be stored in memory 130 by way of example, and not limitation, as well as an operating system, one or more application programs, other program modules, and program data. Each of the operating system, one or more application programs, other program modules, and program data or some combination thereof, may include an implementation of a networking environment. Program modules 152 generally carry out the functions and/or methodologies of embodiments of the invention as described herein.

Computer system/server 110 may also communicate with one or more external devices 190 such as a keyboard, a pointing device, a display 180, a disk drive, etc.; one or more devices that enable a user to interact with computer system/server 110; and/or any devices (e.g., network card, modem, etc.) that enable computer system/server 110 to communicate with one or more other computing devices. Such communication can occur via Input/Output (I/O) interfaces 170. Still yet, computer system/server 110 can communicate with one or more networks such as a local area network (LAN), a general wide area network (WAN), and/or a public network (e.g., the Internet) via network adapter 160. As depicted, network adapter 160 communicates with the other components of computer system/server 110 via bus 122. It should be understood that although not shown, other hardware and/or software components could be used in conjunction with computer system/server 110. Examples, include, but are not limited to: microcode, device drivers, redundant processing units, external disk drive arrays, Redundant Array of Independent Disk (RAID) systems, tape drives, data archival storage systems, etc.

Figure 2:
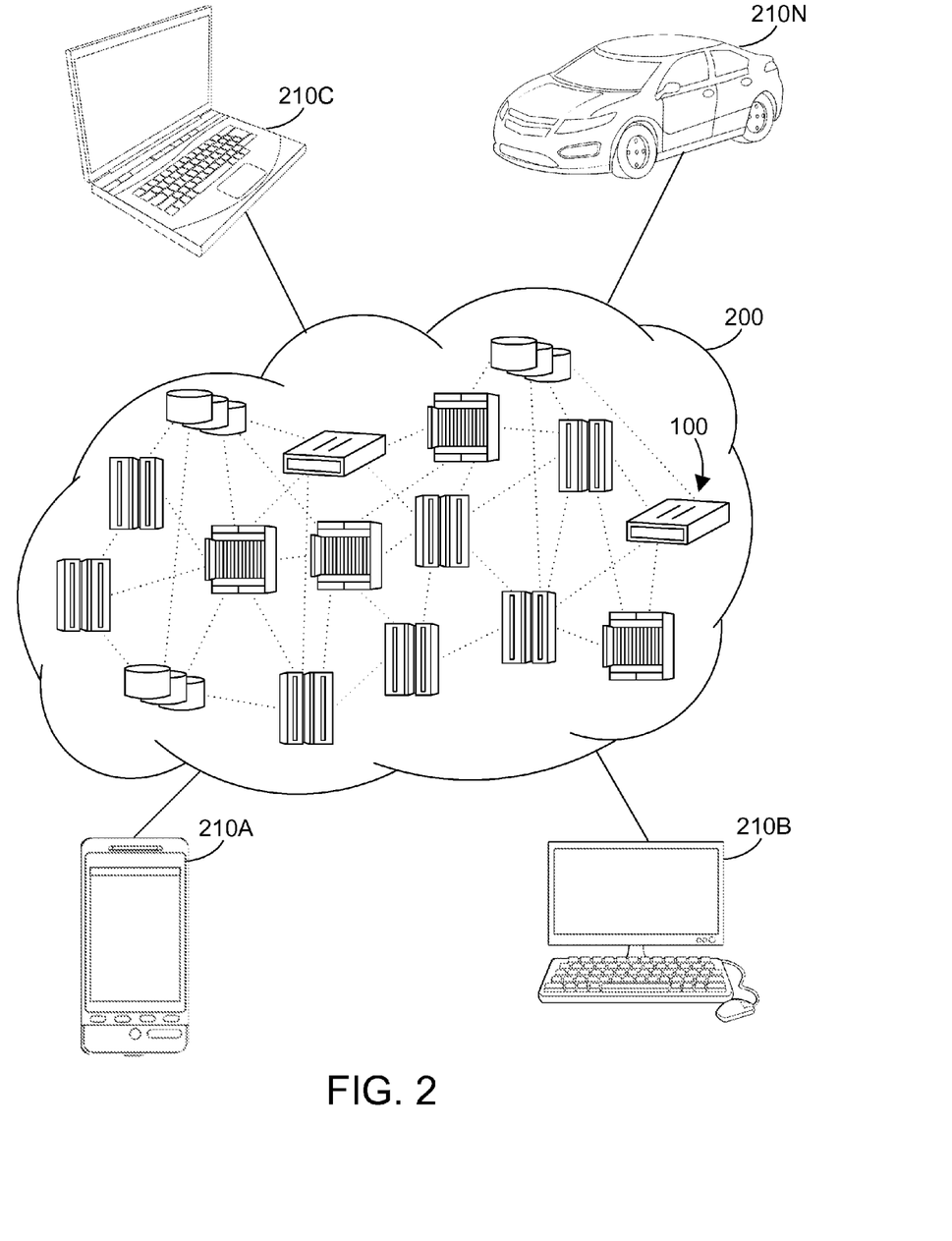
FIG. 2 is a block diagram of a cloud computing environment.

Referring now to FIG. 2, illustrative cloud computing environment 200 is depicted. As shown, cloud computing environment 200 comprises one or more cloud computing nodes 100 with which local computing devices used by cloud consumers, such as, for example, personal digital assistant (PDA) or cellular telephone 210A, desktop computer 210B, laptop computer 210C, and/or automobile computer system 210N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 210A-N shown in FIG. 2 are intended to be illustrative only and that computing nodes 100 and cloud computing environment 200 can communicate with any type of computerized device over any type of network and/or network addressable connection (e.g., using a web browser).

Figure 3:
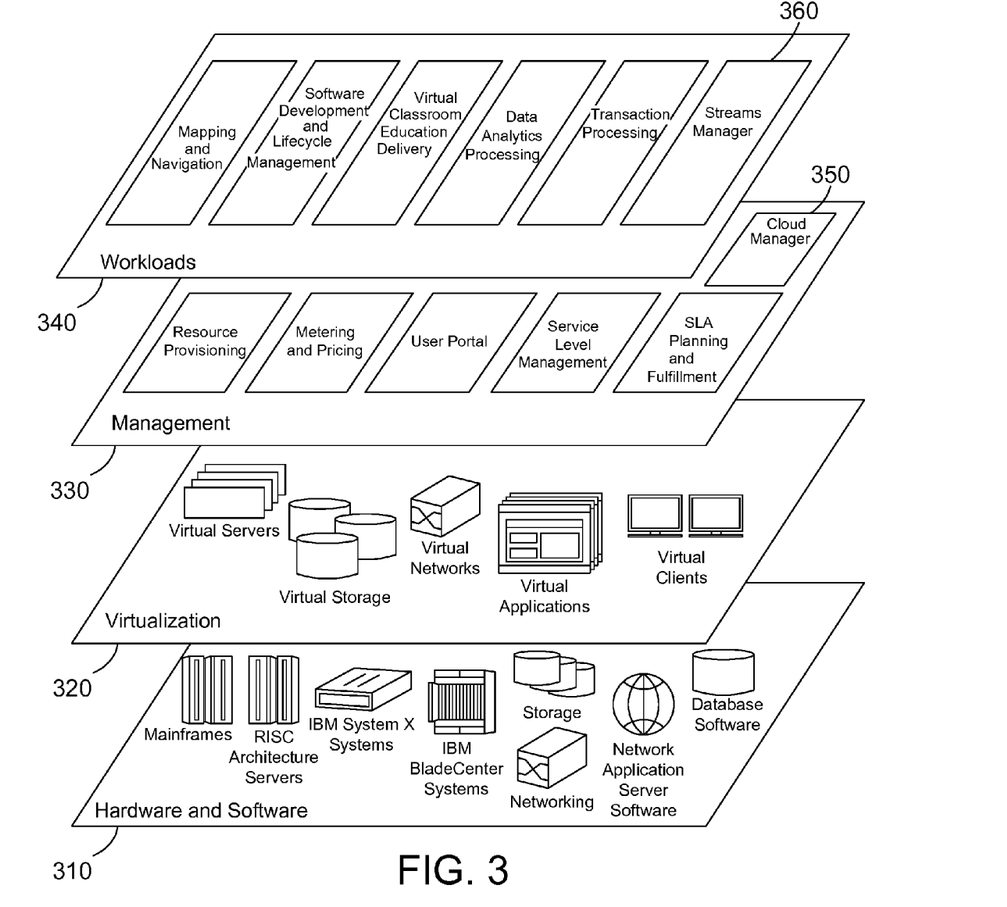
FIG. 3 is a block diagram of abstraction model layers.

Referring now to FIG. 3, a set of functional abstraction layers provided by cloud computing environment 200 in FIG. 2 is shown. It should be understood in advance that the components, layers, and functions shown in FIG. 3 are intended to be illustrative only and the disclosure and claims are not limited thereto. As depicted, the following layers and corresponding functions are provided.

Hardware and software layer 310 includes hardware and software components. Examples of hardware components include mainframes, in one example IBM System z systems; RISC (Reduced Instruction Set Computer) architecture based servers, in one example IBM System p systems; IBM System x systems; IBM BladeCenter systems; storage devices; networks and networking components. Examples of software components include network application server software, in one example IBM WebSphere® application server software; and database software, in one example IBM DB2® database software. IBM, System z, System p, System x, BladeCenter, WebSphere, and DB2 are trademarks of International Business Machines Corporation registered in many jurisdictions worldwide.

Virtualization layer 320 provides an abstraction layer from which the following examples of virtual entities may be provided: virtual servers; virtual storage; virtual networks, including virtual private networks; virtual applications and operating systems; and virtual clients.

In one example, management layer 330 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. A cloud manager 350 is representative of a cloud manager as described in more detail below.

While the cloud manager 350 is shown in FIG. 3 to reside in the management layer 330, cloud manager 350 can span all of the levels shown in FIG. 3, as discussed in detail below.

Workloads layer 340 provides examples of functionality for which the cloud computing environment may be utilized. Examples of workloads and functions which may be provided from this layer include: mapping and navigation; software development and lifecycle management; virtual classroom education delivery; data analytics processing; transaction processing; and a streams manager 360, as discussed in more detail below.

As will be appreciated by one skilled in the art, aspects of this disclosure may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
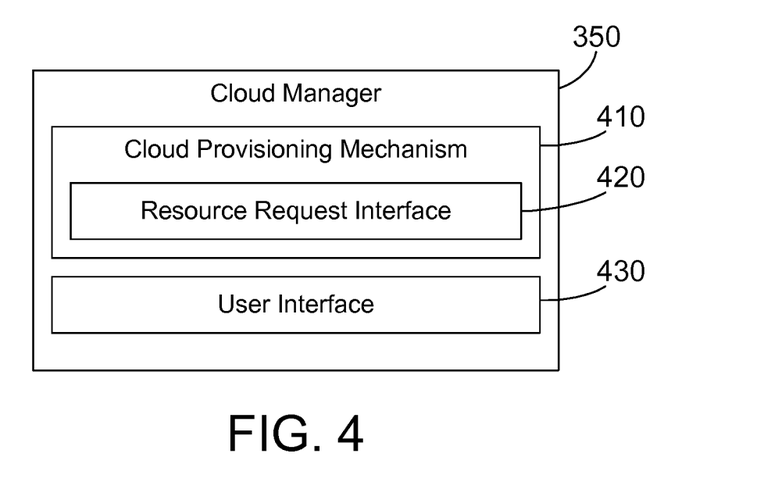
FIG. 4 is a block diagram showing some features of a cloud manager.

FIG. 4 shows one suitable example of the cloud manager 350 shown in FIG. 3. The cloud manager 350 includes a cloud provisioning mechanism 410 that includes a resource request interface 420. The resource request interface 420 allows a software entity, such as the streams manager 360, to request without human intervention virtual machines from the cloud manager 350 or to tear down specified virtual machines by the cloud manager 350. The cloud manager 350 also includes a user interface 430 that allows a user to interact with the cloud manager to perform any suitable function, including provisioning of VMs, destruction (tearing down) of VMs, performance analysis of the cloud, etc. The difference between the resource request interface 420 and the user interface 430 is a user must manually use the user interface 430 to perform functions specified by the user, while the resource request interface 420 may be used by a software entity to request provisioning or destruction of cloud resources by the cloud mechanism 350 without input from a human user. Of course, cloud manager 350 could include many other features and functions known in the art that are not shown in FIG. 4.

Figure 5:
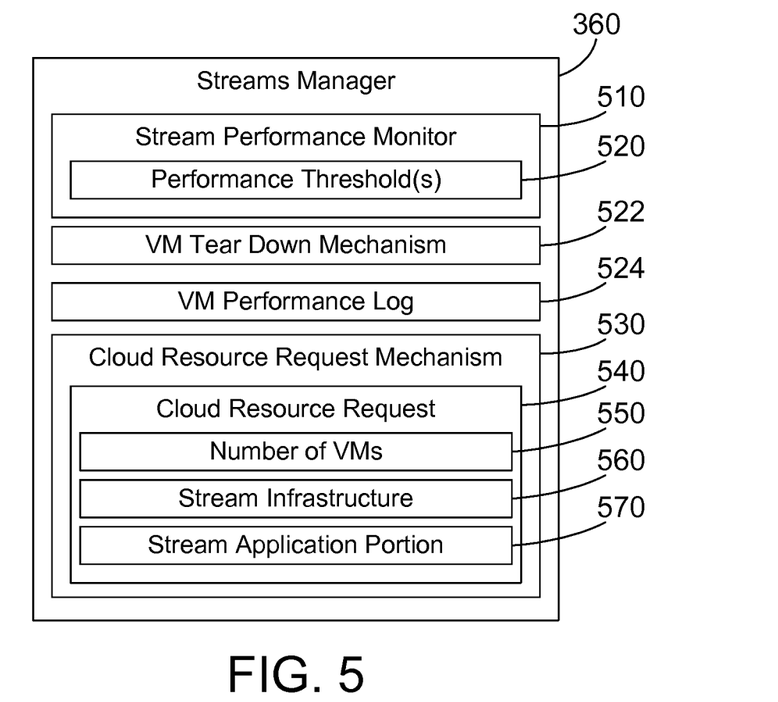
FIG. 5 is a block diagram showing some features of a streams manager.

FIG. 5 shows one suitable example of the streams manager 360 shown in FIG. 3. The streams manager 360 is software that manages one or more streaming applications, including creating operators and data flow connections between operators in a flow graph that represents a streaming application. The streams manager 360 includes a performance monitor 510 with one or more performance thresholds 520. Performance thresholds 520 can include static thresholds, such as percentage used of current capacity, and can also include any suitable heuristic for measuring performance of a streaming application as a whole or for measuring performance of one or more operators in a streaming application. Performance thresholds 520 may include different thresholds and metrics at the operator level, at the level of a group of operators, and/or at the level of the overall performance of the streaming application. The stream performance monitor 510 monitors performance of a streaming application, and when current performance compared to the one or more performance thresholds 520 indicates current performance needs to be improved, the stream performance monitor 510 may communicate the need for resources to the cloud resource request mechanism 530. The cloud resource request mechanism 530, in response to the communication from the stream performance monitor, assembles a cloud resource request 530, which can include information such as a number of VMs to provision 550, stream infrastructure needed in each VM 560, and a stream application portion 570 for each VM. Once the cloud resource request 530 is formulated, the streams manager 360 submits the cloud resource request 530 to a cloud manager, such as cloud manager 350 shown in FIGS. 3 and 4.

The cloud resource request can be formatted in any suitable way. A simple example will illustrate two suitable ways for formatting a cloud resource request. Let's assume the streams manager determines it needs two VMs, where both have common stream infrastructure, with a first of the VMs hosting operator A and the second of the VMs hosting operator B. The cloud resource request 540 in FIG. 5 could specify two VMs at 550, could specify the common stream infrastructure, such as an operating system and middleware, at 560, and could specify operator A and operator B at 570. In response, the cloud manager would provision two VMs with the common stream infrastructure, with the first of the VMs hosting operator A and the second of the VMs hosting operator B. In the alternative, the cloud resource request 540 could be formulated such that each VM is specified with its corresponding stream infrastructure and stream application portion. In this configuration, the cloud resource request would specify a first VM with the common stream infrastructure and operator A, and a second VM with the common stream infrastructure and operator B.

The streams manager 360 includes a VM tear down mechanism 522. When the streams manager 360 determines from the performance monitor 510 a VM is no longer needed, the VM tear down mechanism 522 makes a request via the resource request interface 420 of the cloud provisioning mechanism 410 to tear down a specified VM. In response, the cloud manager 350 will then tear down the specified VM. Streams manager 360 also includes a VM performance log 524. Any suitable performance data regarding one or more operators monitored by the streams performance monitor 510 can be logged in VM performance log 524. In one particular embodiment, when different VMs are deployed that operate on parallel portions of a flow graph, the characteristics of the VMs and their respective performance is logged. This can help in making future decisions when a similar parallel portion of the flow graph needs to be created in a VM by analyzing the VM performance log 524 to determine a configuration for a VM that had the best performance in the past. By creating a VM based on a configuration in the VM performance log, it is more likely the VM will perform better.

Figure 6:
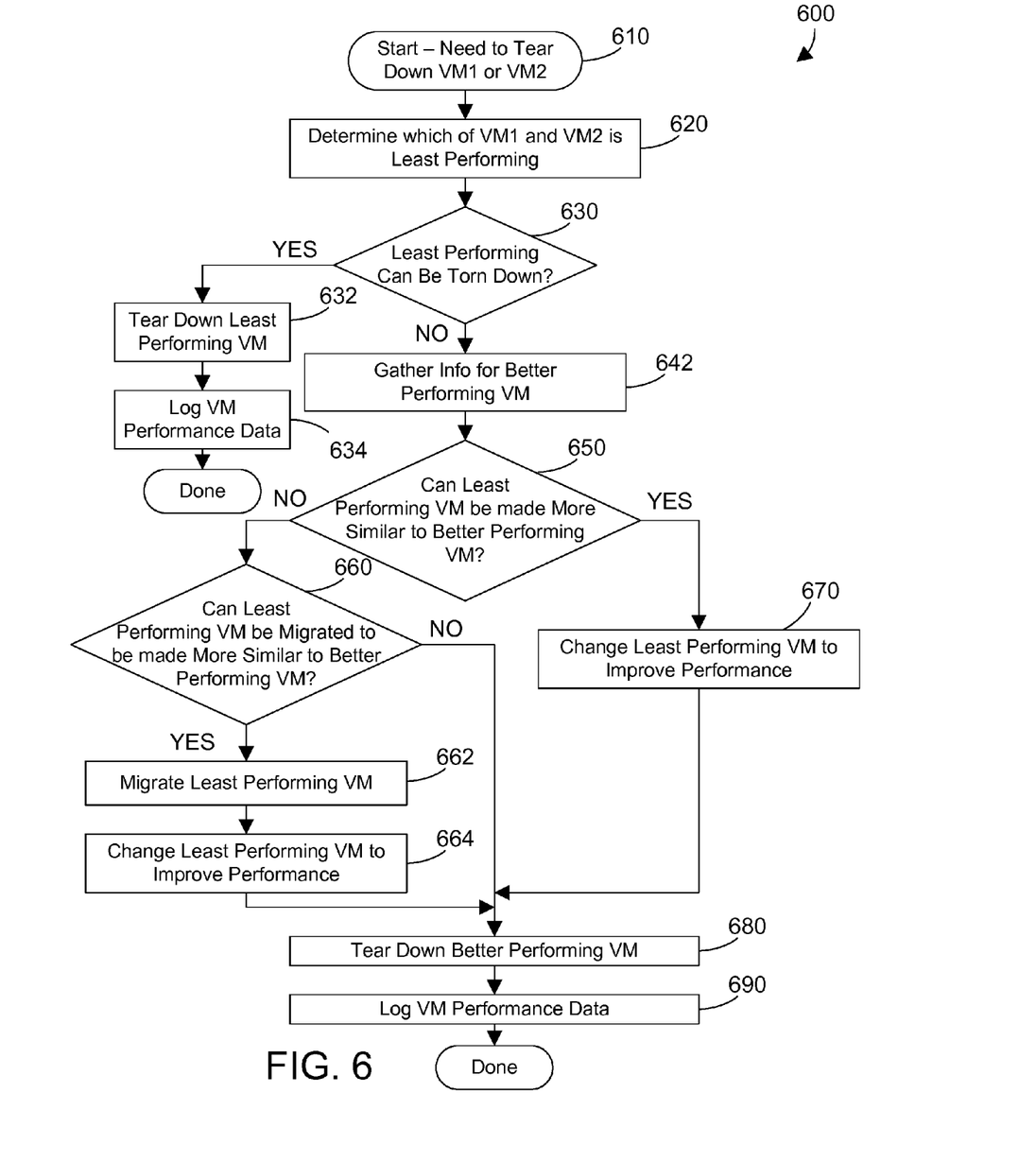
FIG. 6 is a flow diagram of a method for a streams manager to manage a streaming application by tearing down one of multiple parallel paths in a flow graph implemented in different VMs.
Figure 7:
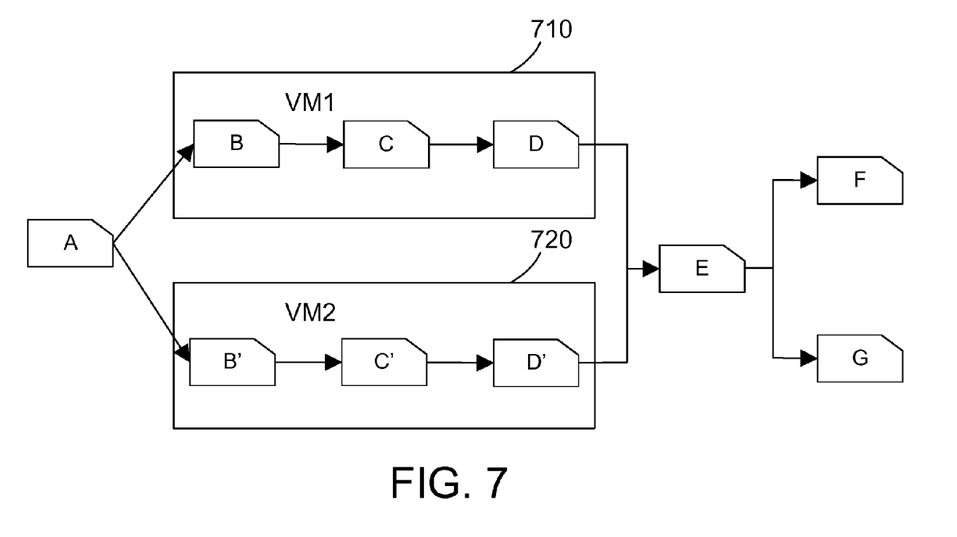
FIG. 7 is a block diagram of one specific example of a streaming application.

FIG. 6 shows one suitable example of a method 600 for managing a streaming application. Method 600 begins with a need to tear down either VM1 or VM2 (step 610). Method 600 assumes a flow graph has been deployed such that parallel portions of the flow graph reside in different VMs. One simple example for parallel portions being deployed to two different VMs is shown in the flow graph in FIG. 7. A first virtual machine 710 and a second virtual machine 720 have similar operators and connections between operators, and operate on data tuples in parallel. Thus, each VM 710 and 720 receives tuples from operator A, and each VM 710 and 720 outputs tuples to operator E. Within each VM, the tuples received from operator A are processed by operators B and B', which output their tuples to respective operators C and C', which output their tuples to respective operators D and D', which both output their tuples to operator E. The tuples output from operator E are sent to operators F and G. One reason to have a flow graph as shown in FIG. 7 with parallel portions is when a streams operator replicates part of the flow graph to another VM to improve performance of the streaming application. Thus, the original flow graph might have included A, B, C, D, E, F and G shown in FIG. 7. In response to monitoring the performance of the operators, the streams manager could decide to replicate operators B, C and D in a different VM 720 as B', C' and D' to improve performance, resulting in the configuration shown in FIG. 7.

The example above illustrates one scenario that accounts for creating parallel portions of a flow graph on different VMs. However, the disclosure and claims herein extend to any flow graph that includes any suitable number of operators implemented in parallel on two or more VMs. As used herein, two portions of the flow graph are in parallel if they implement the same or similar operators interconnected by similar connections and if they receive tuples from the same source and output tuples to the same sink. In one specific implementation, the operators in two parallel portions of the flow graph could be identical. In another specific implementation, the operators may be similar in performing an equivalent function in terms of output tuples buy may perform that function in a different way.

For ease of illustration, method 600 in FIG. 6 assumes two parallel VMs as shown in FIG. 7 that implement parallel portions of the flow graph. Of course, other configurations are possible. For example, there could be five different VMs that each implement the same parallel portion of the flow graph. Let's assume the streams manager determines from the performance monitor two of these five VMs are no longer needed. Steps very similar to method 600 could then be performed to tear down two of the five VMs. These are other variations will be obvious to one of ordinary skill in the art.

When the streams manager determines to tear down either VM1 or VM2 (step 610), the streams manager determines which of VM1 and VM2 is least performing (step 620), preferably using the stream performance monitor 510 shown in FIG. 5. In the case of a streaming application, determining which is least performing could be a simple process of determining the rate of processing tuples by each VM. However, least performing does not necessarily mean the VM that is processing tuples at the lesser rate. For example, an operator could be one that has to provide response tuples in a set amount of time no matter what. In that case, the throughput wouldn't indicate which is least performing. Instead, the number of tuples ignored by each operator could be a measure of least performing, where the operator (or VM) that ignores more tuples is least performing. For this simple example in FIG. 6, we assume the rate of processing tuples is an accurate gauge of performance, and further assume VM1 processes tuples at a rate less than VM2, so VM1 is least performing and VM2 is better performing. A determination is made whether the least performing VM can be torn down (step 630). When the least performing VM can be torn down (step 630=YES), the least performing VM is torn down (step 632) and the VM performance data for the torn down VM is logged (step 634). Note that step 634 may be optional at the time of tearing down the least performing VM, because the VM performance data for the least performing VM may have already been logged prior to tearing down the least performing VM.

When the least performing VM cannot be torn down (step 630=NO), information is gathered from the better performing VM (step 642). This information could include, for example, performance data as well as resource allocations for the VM. There are different circumstances that can result in not wanting to tear down a least performing VM. For example, a VM cannot be torn down (step 630=No) when the least performing VM is on a permanently assigned server or when the least performing VM has been running longer and is therefore providing more accurate results. Of course, there are other circumstance where the least performing VM cannot be torn down, or should not be torn down based on any suitable criteria or heuristic. When the least performing VM can be made more similar to the better performing VM (step 650=YES), the least performing VM is changed to improve its performance (step 670). The better performing VM is then torn down (step 680). When the least performing VM cannot be made more similar to the better performing VM (step 650=NO), a determination is made whether the least performing VM can be migrated to be made more similar to the better performing VM (step 660). A simple example will illustrate. Let's assume the least performing VM has only half the memory allocated to it than the better performing VM, but there is no more memory available to allocate to the least performing VM. In this case, if the least performing VM is migrated to a different host that has enough available memory, the least performing VM can then be changed by increasing the memory allocated to it. When the least performing VM can be migrated to a different location, such as a physical host, to be made more similar to the better performing VM (step 660=YES), the least performing VM is migrated (step 662) and changed to improve its performance (step 664). The better performing VM is then torn down (step 680). When the least performing VM cannot be migrated to be made more similar to the better performing VM (step 660=NO), the better performing VM is then torn down (step 680) and the performance data is logged (step 690). Note the logging of performance data in step 690 may be optional.

Referring again to FIG. 7, if we assume VM1 is least performing and VM2 is better performing, and if we assume VM1 can be torn down, method 610 would flow through steps 610, 620 and 630=YES, VM1 will be torn down in step 632, and performance data for VM1 can be optionally logged at 634.

While the simple example in FIG. 7 shows three operators B, C and D that are implemented in parallel in two separate VMs, this is not to be construed as limiting of the concepts herein. Any suitable number of operators could be deployed in parallel in any suitable number of VMs. The disclosure and claims herein expressly extend to any number of virtual machines that implement any suitable number of operators in parallel in a flow graph of a streaming application.

Figure 8:
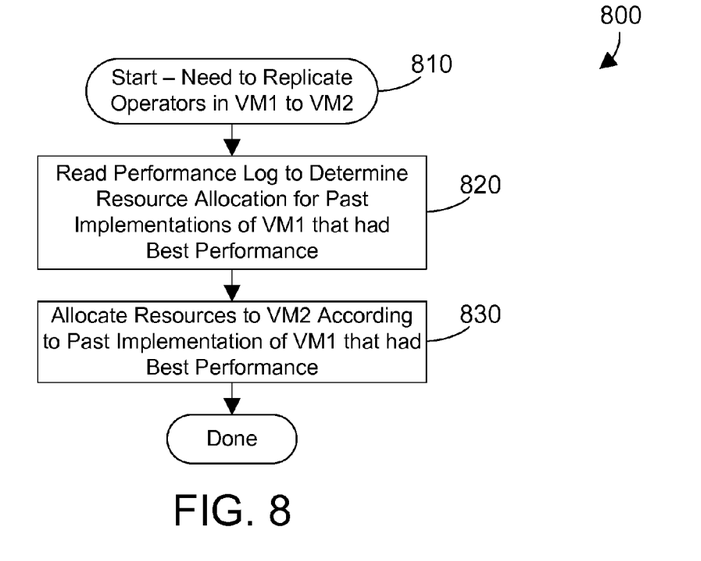
FIG. 8 is a flow diagram of a method for creating a VM based on logged performance data.

Referring to FIG. 8, a method 800 can take advantage of the previously-logged performance data for VMs when provisioning a VM. Method 800 begins when there is a need to replicate operators in a first VM to a second VM (step 810). Thus, if the flow graph in FIG. 7 did not include VM2, which contains operators B', C' and D', a streams manager may determine that replicating operators B, C and D in a separate VM will improve performance of the streaming application. The performance log is read to determine resource allocation for past implementations of VM1 that had the best performance (step 820). In other words, the performance log can include performance data for different VMs that were implemented in the past. The resources are allocated to the new VM2 according to the past implementation of VM1 that had the best performance (step 830). Thus, if the performance log shows that allocating twice the memory to VM1 that implemented operators B, C and D resulted in better performance, then the same doubled memory amount could be allocated to VM2 in step 830. Note the enhancement provided by method 800 can be achieved even when a better performing VM must be torn down in step 680 in FIG. 6. The logging of the performance data makes the streams manager smarter the next time it needs to deploy the same operators to a VM in the future.

Note the terminology used herein refers to "tearing down" a VM. This is vernacular that is common and understood by one of ordinary skill in the art to refer to any way to get rid of a VM, which is typically done by stopping the VM and de-allocating the VM's resources back to the cloud manager, resulting in the VM no longer existing. The tearing down of a VM as used herein is thus deemed to be equivalent to eliminating a VM, destroying a VM, deleting a VM, or any other term that denotes the VM as an entity running on computer hardware ceases to exist. Note also that tearing down a VM can include multiple steps by different entities. For example, in FIGS. 4 and 5, the streams manager 360 could tear down a VM by the VM tear down mechanism 522 sending a request to the resource request interface 420 of the cloud provisioning mechanism 410 in the cloud manager 350, which would result in the cloud manager 350 tearing down the VM.

The disclosure and claims herein relate to a streams manager that monitors performance of parallel portions of a streaming application implemented in multiple virtual machines (VMs). When the performance provided by the multiple VMs is no longer needed, one or more of the VMs can be torn down. The performance of the VMs is monitored. When the least performing VM can be torn down, it is torn down. When the least performing VM cannot be torn down, information regarding a better performing VM is gathered, and it is determined whether the least performing VM can be made more similar to the better performing VM. When the least performing VM can be made more similar to the better performing VM, the least performing VM is changed to improve its performance, and the better performing VM is torn down.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A computer-implemented method executed by at least one processor for managing a streaming application, the method comprising:

executing a streaming application that comprises a flow graph that includes a plurality of operators that process a plurality of data tuples, wherein the flow graph comprises a first set of operators implemented in a first virtual machine and a second set of operators implemented in a second virtual machine, wherein the first set of operators and the second set of operators include similar operators and connections between operators and operate on data tuples in parallel;

monitoring performance of the streaming application;

when performance of the streaming application indicates processing data tuples in parallel by the first set of operators and the second set of operators is no longer needed, determining which of the first virtual machine and second virtual machine is least performing;

when the least performing virtual machine can be torn down, tearing down the least performing virtual machine;

wherein when the least performing virtual machine cannot be torn down:

gathering data regarding a better performing virtual machine operating on the flow graph in parallel with the least performing virtual machine;

when the least performing virtual machine can be made more similar to the better performing virtual machine, making at least one change to the least performing virtual machine to improve performance of the least performing virtual machine; and tearing down the better performing virtual machine;

wherein when the least performing virtual machine cannot be made more similar to the better performing virtual machine:

determining when the least performing virtual machine can be migrated to a location where the least performing virtual machine can be made more similar to the better performing virtual machine;

migrating the least performing virtual machine to the location;

making at least one change to the least performing virtual machine to improve performance of the least performing virtual machine; and tearing down the better performing virtual machine.

2. The method of claim 1 wherein when the least performing virtual machine cannot be migrated, tearing down the better performing virtual machine.

3. The method of claim 1 further comprising logging performance data for each virtual machine that includes operators in the flow graph.

4. The method of claim 3 further comprising using the logged performance data to determine a desired configuration for a new virtual machine that implements a new set of operators that operate on data tuples in parallel with operators in at least one existing virtual machine.

5. The method of claim 1 wherein tearing down the least performing virtual machine comprises sending a request to a cloud manager to tear down the least performing virtual machine.

6. The method of claim 1 wherein tearing down the better performing virtual machine comprises sending a request to a cloud manager to tear down the better performing virtual machine.

7. A computer-implemented method executed by at least one processor for managing a streaming application, the method comprising:

executing a streaming application that comprises a flow graph that includes a plurality of operators that process a plurality of data tuples, wherein the flow graph comprises a first set of operators implemented in a first virtual machine and a second set of operators implemented in a second virtual machine, wherein the first set of operators and the second set of operators include similar operators and connections between operators and operate on data tuples in parallel;

monitoring performance of the streaming application;

when performance of the streaming application indicates processing data tuples in parallel by the first set of operators and the second set of operators is no longer needed, determining which of the first virtual machine and second virtual machine is least performing;

when the least performing virtual machine can be torn down, tearing down the least performing virtual machine;

when the least performing virtual machine cannot be torn down:

gathering data regarding a better performing virtual machine operating on the flow graph in parallel with the least performing virtual machine;

when the least performing virtual machine can be made more similar to the better performing virtual machine, making at least one change to the least performing virtual machine to improve performance of the least performing virtual machine; and tearing down the better performing virtual machine;

when the least performing virtual machine cannot be made more similar to the better performing virtual machine:

determining when the least performing virtual machine can be migrated to a location where the least performing virtual machine can be made more similar to the better performing virtual machine;

migrating the least performing virtual machine to the location;

making at least one change to the least performing virtual machine to improve performance of the least performing virtual machine; and tearing down the better performing virtual machine;

when the least performing virtual machine cannot be migrated, tearing down the better performing virtual machine.

8. The method of claim 7 further comprising logging performance data for each virtual machine that includes operators in the flow graph.

9. The method of claim 8 further comprising using the logged performance data to determine a desired configuration for a new virtual machine that implements a new set of operators that operate on data tuples in parallel with operators in at least one existing virtual machine.

* * * * *